United States Patent Office 3,704,147
Patented Nov. 28, 1972

3,704,147
FIBROUS INORGANIC MATERIALS
Clarence James Hardy, Wantage, and Michael Joseph Holdoway, Abingdon, England, assignors to United Kingdom Atomic Energy Authority, London, England
No Drawing. Filed Apr. 30, 1970, Ser. No. 33,514
Claims priority, application Great Britain, May 6, 1969, 23,174/69
Int. Cl. C04b 31/04
U.S. Cl. 106—55   9 Claims

ABSTRACT OF THE DISCLOSURE

Fibres of an inorganic material such as zirconia or alumina are made by preparing a highly viscous but treacly sol of the material and spray drying the sol under conditions which favour the formation of fibres as distinct from rounded particles.

---

The present invention relates to improvements in fibrous inorganic materials and has particular reference to polycrystalline fibres of a refractory nature.

Inorganic refractory fibres are difficult to make. Glass fibres (which are inorganic but not refractory) can be drawn from a melt, but refractory oxides such as alumina and zirconia are very difficult to melt-draw because of their high melting point and the low viscosity of the melt. It is apparent that such inorganic refractory fibres, if they could readily be made, would be suitable for many high temperature uses as insulation and reinforcements and generally for the replacement of existing fibres for use at higher temperatures.

It is an object of the present invention to provide a process for the production of inorganic fibres.

According to the present invention there is provided a process for the production of inorganic fibres comprising forming a treacly viscous aqueous sol, spray drying such sol under such conditions that gel fibres are formed, and then calcining the gel fibres.

It will be appreciated that many inorganic oxides can be formed into sols by the addition of a limited amount of acid and that under many circumstances these sols can be produced in such a concentration that they are viscous. We prefer to use a viscosity in excess of 500 centipoises at 25° C. and the consistency of the sols should be in the nature of treacle rather than being thixotropic.

It will be appreciated that the viscosity of the feed sol will initially decrease with increase in temperature in the course of the spray drying treatment but that as drying proceeds the sol concentration increases and the viscosity increases until drying is complete. It is found however that in general an initial viscosity of 500 centipoises at 25° C. is required to achieve a useful proportion of fibres in the product.

The drying temperature is not critical but rapid drying rates tend to cause the formation of air bubbles in the fibres. It has been found that bubble formation is minimised so long as the outlet air temperature is maintained below 100° C. by controlling the sol flow rate or the air inlet temperature.

In general, this treacly type of viscosity is exhibited by sols having a high anion to metal ratio (approx. 1:1) and the viscosity may be adjusted by alteration of the sol concentration. However, in many cases the viscosity of the sol increases on ageing, and this may sometimes be accelerated by a simple heat treatment. For example, a sol containing 3.78 m. zirconia had an initial viscosity of 26.3 cps.; after heating at 70° C. for five hours, the viscosity had increased to 246 cps., and to 6,990 cps. after 2 hours at 80° C.

With some inorganic materials however it may prove impossible to obtain a sol having these characteristics, and the invention therefore contemplates that the sol may be based upon an organic material to provide the necessary viscosity but contain a sufficient concentration of an inorganic salt or other compound which can be calcined to give an oxide.

Small fibre diameters can be achieved by using lower concentrations of sol, the required viscosity being achieved by pretreatment, e.g. ageing, conditioning at high temperatures, alteration of metal:anion ratio, lowering the pH (of an acid sol), or incorporation of a viscous additive.

If coloured fibres are desired, the sol to be spray dried may contain conventional inorganic colourants.

Although the invention primarily relates to inorganic oxide fibres it should be understood that the sol may contain a carbon dispersion and the calcining may be conducted in an atmosphere (such as carbon monoxide) that a carbide fibre is obtained. Alternatively, a nitriding atmosphere may be used to produce a nitride fibre.

We prefer to use a spray drier of the type having an atomiser disc spun, or capable of being spun, at a speed in excess of 35,000 r.p.m., and we have found that the fibre production is increased by the use of a high flow rate of sol to the spray drier. Convenient air inlet temperatures are in the range of 200–250° C. and air outlet temperatures in the range 100–120° C.

In common with most sol-gel processes, the calcination temperature will depend upon the precise material, but temperatures in the range 700–1000° C. will usually be suitable. It will also be apparent that if the gel fibres are not produced in 100% yield, the remaining material will be in the nature of rounded particles (possibly of very irregular shape) and these can easily be recycled since they are gels and are readily dispersed in water to reform the sol.

In our experiments we have produced quantities of fibres of diameter in the range 1–10 microns (the diameter depending on the concentration of the sol) and in lengths up to and exceeding 1 mm.

In order that the present invention may more readily be understood certain embodiments of the same will now be described by way of example.

EXAMPLE 1

In the first embodiment a zirconia sol was made as described in our British Pat. No. 1,181,794 to a zirconium concentration of 3.5 M. This sol was conventionally spray dried to produce a powder gel, and 100 g. of this gel was dissolved or dispersed by stirring into 1 litre of the sol. This concentrated sol was fed to a NIRO mobile minor spray drier at an atomiser speed of 37,000 r.p.m., 215° C. air inlet temperature, and 120° C. air outlet temperature. The product consisted of about 10% of fibres, the remainder being spheres and aggregates. The fibres could readily be separated from the spheres by sieving through a sieve of 710 micron mesh since the fibres tend to mat and are retained on the sieve. The fibres were approximately 2 microns in diameter and 100 microns long and were calcined at about 700° C.

EXAMPLE 2

In the second experiment zirconia gel was dispersed in the zirconia sol to give a concentrated zirconia sol having the following characteristics:

$Zr_{O2}$=5.76 M
$NO_3/Zr$=1.1
Density=1.84 g./ml.
Viscosity=561 cps. (22° C.)
Surface tension=64.6 dynes/cm.
Solids content=63.4% (g. of gel/100 ml.)

This concentrated zirconia sol was fed to the spray drier at a flow rate of 2.4 litres per hour, the spray drier operating with an inlet temperature of 215° C., an outlet temperature of 110° C., and an atomiser speed of 38,000 r.p.m. A large amount of fibres were formed, the tap density of the product being 0.137 g./ml.

EXAMPLE 3

A mixed zirconia-calcia sol was made up according to the process described in the said prior application and had the following characteristics:

$Zr_{O2}$=3.63 M
CaO=0.42 M
$ZrO_2+CaO$=474 g./l.
Solids content=793 g. gel/l.
Density=1.56 g./ml.
Viscosity=45 cps. at 25° C.

It will be noted that this sol had a relatively low viscosity and when fed to the spray drier, substantially under the conditions described in the previous example, the yield of fibres was only about 1%.

EXAMPLE 4

The spray-dried zirconia-calcia gel from Example 3 was then dispersed at the rate of 300 g. in 600 ml. of the sol used in Example 3 to give a more concentrated viscous sol having the following characteristics:

$ZrO_2+CaO$=609 g./l.
Solids content=1020 g. gel/l.
Density=1.72 g./ml.
Viscosity=1057 cps. at 25° C., 400 cps. at 50°

This concentrated sol was fed to the atomiser at 0.92 litre per hour to give a yield of over 50% of fibres when the inlet temperature was 170° C. and the outlet temperature 100° C. Increasing the flow rate of 3.4 litres per hour gave an increased yield of fibres.

The product was calcined at 1400° C. in a current of air to convert the gel into stabilised zirconia fibres. X-ray analysis showed that the product consisted of a cubic phase with a theoretical density of 5.72 g./ml. Mercury porosimetry at 3 atmospheres pressure indicated a density of 4.87 g./ml. (85% of theoretical density).

EXAMPLE 5

In order to make an alumina sol 1 kg. of aluminium nitrate hydrate was heated on a steam bath and 400 ml. of formaldehyde solution was added in portions, allowing the reaction to subside between additions. When the denitration reaction had finished, the mixture had a pink colour and heating was continued for 3 hours. Thereafter the volume was adjusted to 520 ml. to give a sol with the following characteristics:

Al=4.06 M
$NO_3$=4.34 M
$NO_3/Al$=1.07
Density=1.35 g./ml.
Viscosity=16.7 cps. (22° C.)

This material was fed to the spray drier at 1.5 litres per hour and at an inlet temperature of 240° C. A fibrous product was obtained but it contained a large proportion of non-fibrous material.

EXAMPLE 6

330 g. of the gel product from Example 5 was dispersed in 200 g. of water to give a sol which was 5.43 molar in aluminium, had a density of 1.41 g./ml. and a viscosity of about 500 cps., the viscosity increasing with time. This concentrated sol was fed to the atomiser at 1 litre per hour and a large quantity of fibres was produced, these fibres mainly being about 10 microns in diameter and up to 1 mm. long.

EXAMPLE 7

A highly viscous but thixotropic alumina sol with an anion to metal ratio of 0.025:1 was prepared by the method described in our British Pat. No. 1,174,648, gum arabic was added to the feed sol and the product contained a useful proportion of fibres which were separated by sieving.

In the preparation of coloured fibres, specifically zircon fibres, the basic feed sol contains a zirconia sol as above described and also a silica sol. It is arranged that the sols are stabilised by, or contain in addition, a few percent by weight of chloride or fluoride ions. The mixture also contains a few percent by weight of a transition metal salt, e.g. $Pr^{3+}$, $Fe^{3+}$ or $V^{4+/5+}$. The fibres produced on spray drying are white but when heated to 950–1050° C. the colour is developed. In this specific example the colours are yellow, pink and blue.

Alumina fibres containing blue cobalt aluminate were made by adding a solution of a cobalt salt, e.g. nitrate, to an alumina sol, spray drying the mixture, and calcining the gel fibres in air. Fibres corresponding to 5% $CoO/Al_2O_3$ were pink when formed, and turned a deep blue colour after calcination at 1000° C.

It will be seen from the above examples that a high viscosity feed is necessary to achieve a good yield of fibres and that this yield is in general increased by operating at high flow rates and at high atomiser speeds. In general the diameter of the fibres increases with the solids content of the feed.

We claim:

1. A process for the production of inorganic fibres comprising forming a treacly, viscous aqueous sol of an inorganic refractory metal oxide and an acid, said sol having a viscosity in excess of 500 centipoises at 25° C., spray drying said sol to form gel fibres and then calcining the gel fibres.

2. A process as claimed in claim 1, wherein the sol is dried to form a gel in a spray drier comprising a high speed atomiser disc.

3. A process as claimed in claim 2, wherein the disc is spun at a speed in excess of 35,000 r.p.m.

4. A process as claimed in claim 1, wherein an inorganic colourant is added to the sol.

5. A process as claimed in claim 1, wherein the sol contains a carbon dispersion.

6. A process as claimed in claim 1, wherein the sol has a viscosity dependent upon concentration of the sol, the viscosity being adjusted to the desired value by adjusting the concentration of the sol.

7. A process as claimed in claim 1, wherein the sol has a viscosity dependent upon anion to metal ratio of the sol, the viscosity being adjusted to the desired value by adjusting the anion to metal ratio of the sol.

8. A process as claimed in claim 1, wherein a viscous additive is introduced into the sol to adjust viscosity to the desired value.

9. A process as claimed in claim 1, wherein the sol is subjected to controlled heat treatment to adjust the viscosity to the desired value.

References Cited

UNITED STATES PATENTS

| | | | |
|---|---|---|---|
| 3,082,099 | 3/1963 | Beasley et al. | 106—57 |
| 3,082,103 | 3/1963 | Wainer | 106—57 |
| 3,180,741 | 4/1965 | Wainer et al. | 106—65 |
| 3,271,173 | 9/1966 | Lockhart et al. | 106—65 |
| 3,311,481 | 3/1967 | Sterry et al. | 106—57 |

JAMES E. POER, Primary Examiner

U.S. Cl. X.R.

106—56, 57, 65